No. 889,938.  
PATENTED JUNE 9, 1908.  
R. H. LITTLE.  
SLICING MECHANISM.  
APPLICATION FILED APR. 29, 1907.  
2 SHEETS—SHEET 1.
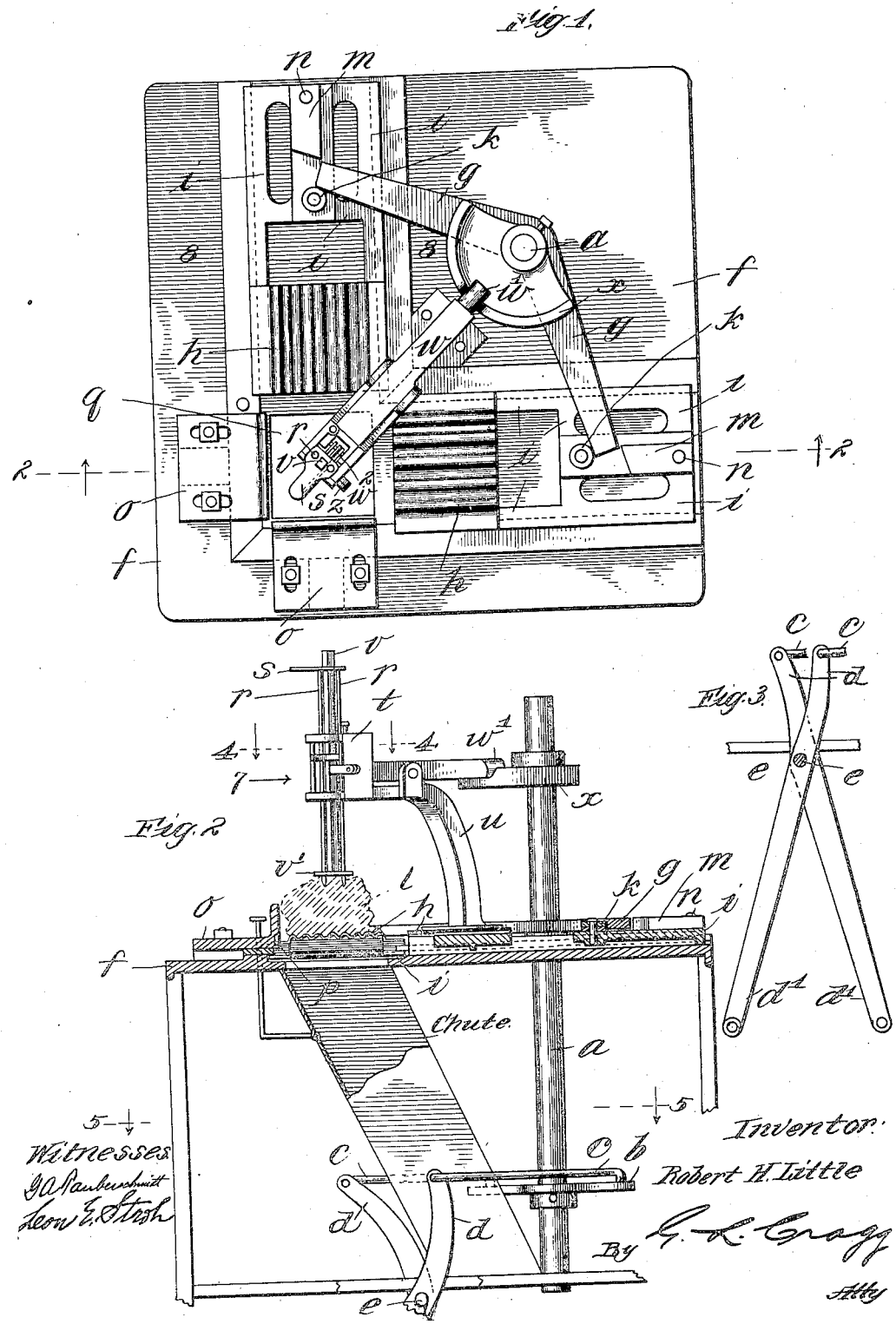
Witnesses  
Inventor  
Robert H. Little  
By G. L. Cragg  
Atty

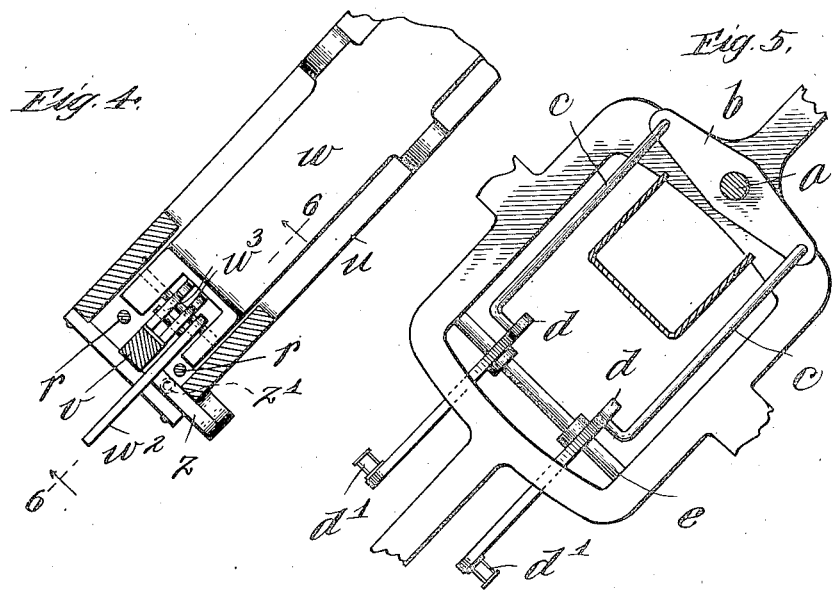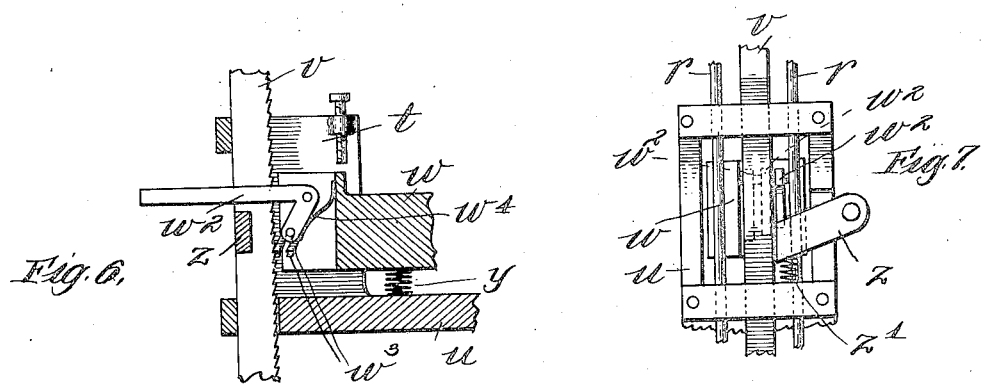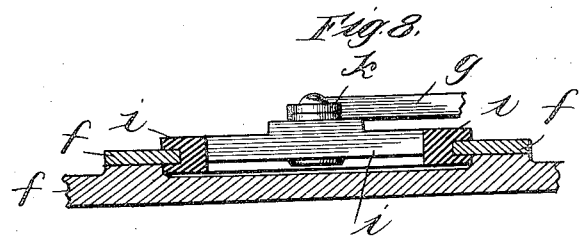

UNITED STATES PATENT OFFICE.

ROBERT H. LITTLE, OF CHICAGO, ILLINOIS.

SLICING MECHANISM.

No. 889,938.    Specification of Letters Patent.    Patented June 9, 1908.

Application filed April 29, 1907. Serial No. 370,875.

*To all whom it may concern:*

Be it known that I, ROBERT H. LITTLE, citizen of the United States, residing at Chicago, in the county of Cook and State of Illinois, have invented a certain new and useful Improvement in Slicing Mechanism, of which the following is a full, clear, concise, and exact description, reference being had to the accompanying drawings, forming a part of this specification.

My invention relates to machines for slicing fruits and vegetables, and has for its general object the provision of a machine that will expeditiously perform this function.

In practicing my invention, I employ two knives or cutters arranged to move in paths that are angularly related, and mechanism for moving one knife toward the fruit or vegetable that is being sliced while the companion knife is being moved away. The knives may be of any suitable shape.

The preferred embodiment of my invention includes fluted knives which are adapted by their joint action upon the fruit or vegetable, to form the slices in the shape of lattice work, though I do not wish to be limited to this embodiment of my invention.

In practicing my invention, I desirably employ a vertically disposed shaft having two angularly related arms projecting therefrom, each serving to direct a knife in its travel. This vertically disposed shaft is oscillated, preferably by means of a pedal action, so that an operator may sit at the machine and operate the knives by the feet.

Another important feature of my invention resides in the provision of an improved feeder which will advance the vegetable or fruit at an even rate toward the knives, so that slices of uniform thickness may be taken from the fruit or vegetable.

I will explain my invention more fully by reference to the accompanying drawing, showing the preferred embodiment thereof, in which—

Figure 1 is a plan view of my improved machine. Fig. 2 is a sectional view on line 2 2 of Fig. 1. Fig. 3 shows the pedal bar, room for illustration of which was lacking in connection with Fig. 2. Fig. 4 is a sectional plan view on line 4 4 of Fig. 2. Fig. 5 is a sectional view on line 5 5 of Fig. 2. Fig. 6 is a view on line 6 6 of Fig. 4. Fig. 7 is a view of a part of the mechanism, in the direction of arrow 7 of Fig. 2. Fig. 8 is a cross-sectional view on line 8 8 of Fig. 1.

Like parts are indicated by similar characters of reference throughout the different figures.

The machine is desirably a foot power machine, and when constructed as such, it desirably includes a vertically disposed shaft $a$, which has a double crank $b$, to the middle portion of which said shaft is rigidly secured, the outer ends of said double crank being connected with links $c$, $c$ that are connected with treadle levers $d$ that are mounted to rotate or oscillate upon a shaft $e$ secured to the frame of the machine, said treadle levers having pedals $d^1$, $d^1$, whereby the levers $d$ are oscillated so as to cause an oscillation of the double crank $b$. The pedal levers are angularly displaced so that as one foot is being moved forwardly, the other foot is being withdrawn. The portion of the shaft $a$ that extends above the deck $f$ of the machine is provided with two arms $g$, $g$ that lie close to said deck and which are adapted to engage the knife structures to impel the same. Each knife structure desirably includes a fluted blade or cutter $h$ mounted upon a sliding block $i$ that is fitted to guides provided in the deck $f$, the guides for one block being desirably disposed at right angles to the guides for the other block, so that the blades $h$, $h$ are confined to the directions of travel that are disposed at right angles to each other. The flutes in one blade are angularly disposed with respect to the flutes in the other blade. The blocks $i$ desirably carry posts $k$ that are engaged by the free ends of the arms $g$, whereby first, one, and then the other of the blades $h$ is moved toward the object to be sliced, such an object being indicated by dotted lines at $l$ in Fig. 2, this object being located at the intersection of the paths of the blades $h$. In order to effect reciprocal movements of the blades $h$, I provide additional posts or stops $m$, which are in engagement with the arms $g$ upon their outward movement. The relation between the parts $m$ and $g$ is such that when the knives have been sufficiently withdrawn so as to clear the object that is being sliced, further outward movement of said arms is prevented, even though the outward movements of the arms $g$ may be continued, to which end I preferably cause the arms $g$ to escape the posts or stops $m$ when the blades $h$ have been sufficiently moved outwardly. By this arrangement each blade $h$ may be driven in, while the companion blade is maintained stationary. The posts $m$, $m$ are desirably mounted at $n$ upon pivotal screws, whereby the points of escapement of the arms $g$ from said posts may be regulated. A stop $o$ is placed opposite the cutting edge of each blade $h$, this stop being desirably adjustable longitudinally of the blade companion thereto, so as accurately to define the limit of travel of the blade. The stops $o$ are desirably made of cast metal throughout the major portion thereof, but, in order that they may not dull the blades, an insert of soft material, as indicated at $p$, is provided, lead answering well the purpose.

It will be seen as the treadles $d^1$, $d^1$ are alternately worked, that the shaft $a$ is rotated, first, in one direction and then in another, whereby the blades $h$ are advanced and withdrawn.

The vegetable or other substance that is to be cut, is placed over the opening $q$ as indicated by dotted lines in Fig. 2, at $l$, and, in order that the substance to be cut may be held in place when neither blade $h$ is over the opening $q$, I provide a needle or needles $r$ that terminate in a head $s$, and which slide through the guide block $t$ provided upon the upper end of the arm $u$ mounted upon the deck $f$ of the machine. As indicated in Fig. 2, said needles are not in holding position, but are placed in a holding position by depressing the head $s$, the block $t$ limiting the lower movement of the needles. The points of the needles, when depressed to their lower limit, are clear of the blades $h$. The intermediate portion of the block $t$ is desirably cut away as indicated most clearly in Figs. 6 and 7, so as to house part of the mechanism that effects an advance of the material that is to be cut, along the needles. This mechanism includes a rack bar $v$ that is provided with a presser foot $v'$ at its lower end, which presser foot is perforated, so that the needles may slide therethrough. This presser foot is brought into snug engagement with the material that is to be sliced, before the machine is set into operation, whereafter said rack bar is depressed, after the removal of each slice by the mechanism to be described, a distance corresponding to the thickness of each slice removed. The mechanism for engaging the rack bar to depress the same at the time stated, includes an arm $w$ pivoted upon the arm or bracket $u$, a roller $w^1$ at one end of the arm, adapted to ride upon a cam $x$, a pawl carrier $w^2$ pivotally mounted upon the arm $w$ and carrying pawls $w^3$ normally maintained in engagement with the rack or rack bar by means of a spring $w^4$. Each time the arms $g$ are moved from the normal position shown in Fig. 1, the roller $w^1$ is caused to rise as it rides upon the cam $x$, whereby the front end of the arm $w$ is depressed, carrying with it the pawl carrier $w^2$ and the pawls $w^3$, one of said pawls forcing the depression of the rack bar a distance equal to the thickness of a slice of material cut away at $l$, the pawls upon the pawl carrier acting alternately to permit this latter function. Each time the roller $w^1$ reaches the depression in the cam $x$, as indicated in Fig. 1, the spring $y$, previously under compression, expands and carries the arm $w$ upwardly, the pawls $w^3$ being carried upwardly without then moving the rack bar. In order to permit of the elevation of the rack bar $v$ for the insertion of new material at $l$, the pawl carrier $w^2$ is projected outwardly as indicated most clearly in Fig. 6, so that it may be depressed for the purpose of removing the pawls from engagement with the rack bar.

To insure maintenance of the rack bar in the positions to which it has been fed, I provide a clutch device $z$, which is pivoted to the head $t$ and which is pressed upwardly by a spring $z^1$. The clutch $z$, when thus pressed upwardly, serves to prevent the elevation of the rack bar, so that if for any reason the pawls $w^3$ fail to prevent the elevation of the rack bar, said clutch will perform this office. As indicated most clearly in Fig. 7, the pawl carrier $w^2$ is arranged over the clutch, so that when the projecting end of said pawl carrier is depressed by the hand, it will depress the clutch against the force of the spring $z^1$, thereby not only relieving the rack bar $v$ of the pawls $w^3$, but also relieving said rack bar of the engagement of the clutch $z$, whereby said rack bar may be fully elevated for the insertion of a fresh body of material at $l$. Where the blades $h$ are fluted as indicated, slices are taken from the material at $l$ which are of lattice work-shape.

It will be seen that I have provided a device including two angularly disposed knives, mechanism for alternately operating the same, the broad or fluted surfaces of said knives being disposed in planes substantially parallel with the slicing cuts made by each knife in the material operated upon by said knives, and mechanism for feeding the material to said knives.

I claim as new and desire to secure by Letters-Patent the following:—

1. A device of the class described including an oscillating shaft $a$ having two arms $g$, two reciprocating cutters, one in engagement with each arm throughout the predetermined range of travel of the associate cutter, each arm and its associate cutter being adapted to separate their engagement when said arm is moved outwardly away from the associate cutter beyond a predetermined limit, guides for the reciprocating cutters, and supporting means for the aforesaid elements.

2. A feeding mechanism including a needle or penetrating element that is adapted to be inserted within material to be fed, a rack bar for forcing the material along said element, means for effecting the movement of the bar with respect to said element, said means including an actuating pawl for engagement with the rack bar, and supporting means for the aforesaid elements.

3. A device of the class described including a cutter for slicing material, a feeding mechanism including a needle or penetrating element that is adapted to be inserted within material to be fed, a rack bar for forcing the material along said element toward the cutter, mechanism for operating the cutter, means for effecting the movement of the bar with respect to said element, said means including an actuating pawl for engagement with the rack bar, and supporting means for the aforesaid elements.

4. A device of the class described including an oscillating shaft $a$ having two arms $g$, two reciprocating cutters, one in engagement with each arm throughout the predetermined range of travel of the associate cutter, each arm and its associate cutter being adapted to separate their engagement when said arm is moved outwardly away from the associate cutter beyond a predetermined limit, guides for the reciprocating cutters, feeding mechanism operated by said shaft, and supporting means for the aforesaid elements.

5. A feeding mechanism including a needle or penetrating element that is adapted to be inserted within material to be fed, cutting or subdividing mechanism for operating upon said material, mechanism for intermittently feeding the material along the needle or penetrating element toward the aforesaid mechanism, and supporting means for the aforesaid elements.

6. A device of the class described including two angularly disposed fluted knives, the flutes in one knife being angularly disposed with respect to the flutes in the other knife, mechanism for alternately operating the same, the broad or fluted surfaces of said knives being disposed in planes substantially parallel with the slicing cuts made by each knife in the material operated upon by said knives, and supporting means for the aforesaid elements.

7. A device of the class described including two angularly disposed fluted knives, the flutes in one knife being angularly disposed with respect to the flutes in the other knife, mechanism for alternately operating the same, the broad or fluted surfaces of said knives being disposed in planes substantially parallel with the slicing cuts made by each knife in the material operated upon by said knives, mechanism for feeding the material to said knives, and supporting means for the aforesaid elements.

8. A device of the class described including two fluted knives adapted to slice material, the knives being relatively arranged so that one knife will produce flutes in said material in one direction and the other knife will produce flutes in said material in a cross direction, and mechanism for operating the knives, the broad or fluted surfaces of said knives being disposed in planes substantially parallel with the slicing cuts made by each knife in the material operated upon by said knives, whereby each slice of material may be fluted upon both sides thereof with the flutes upon one side of each slice angularly disposed with respect to the flutes on the other side of said slice.

In witness whereof, I hereunto subscribe my name this 22nd day of April A. D., 1907.

ROBERT H. LITTLE.

Witnesses:
   Leon G. Stroh,
   G. L. Cragg.